US009764969B2

(12) United States Patent
Lee et al.

(10) Patent No.: US 9,764,969 B2
(45) Date of Patent: Sep. 19, 2017

(54) BIMETALLIC CATALYST FOR HIGH NITRATE NITROGEN REDUCTION AND SELECTIVITY AND MANUFACTURING METHODS THEREOF

(71) Applicant: KOREA ADVANCED INSTITUTE OF SCIENCE AND TECHNOLOGY, Daejeon (KR)

(72) Inventors: Woo Jin Lee, Daejeon (KR); Sung Yoon Jung, Daejeon (KR); Sung Jun Bae, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 14/423,877

(22) PCT Filed: Apr. 9, 2014

(86) PCT No.: PCT/KR2014/003081
§ 371 (c)(1),
(2) Date: Feb. 25, 2015

(87) PCT Pub. No.: WO2015/122561
PCT Pub. Date: Aug. 20, 2015

(65) Prior Publication Data
US 2016/0347633 A1  Dec. 1, 2016

(30) Foreign Application Priority Data

Feb. 12, 2014  (KR) .................. 10-2014-0016262

(51) Int. Cl.
*B01J 23/38* (2006.01)
*B01J 23/745* (2006.01)
(Continued)

(52) U.S. Cl.
CPC ............... *C02F 1/705* (2013.01); *B01J 23/38* (2013.01); *B01J 23/8926* (2013.01);
(Continued)

(58) Field of Classification Search
CPC ...... B01J 23/38; B01J 23/745; B01J 23/8906; B01J 23/8926; B01J 35/002; B01J 37/035;
(Continued)

(56) References Cited

U.S. PATENT DOCUMENTS 4,410,722 A * 10/1983 Miyazaki ............... C07C 69/36
502/327
4,426,319 A * 1/1984 Blanchard ............ B01J 37/024
423/213.5
5,668,075 A      9/1997 Milam et al.

FOREIGN PATENT DOCUMENTS

JP    06-023271 A    2/1994
JP    2007-307485 A  11/2007
(Continued)

OTHER PUBLICATIONS

Gao, W., et al., "Titania supported Pd—Cu bimetallic catalyst for the reduction of nitrate in drinking water," *Applied Catalysis B: Environmental*, 2003, vol. 46, pp. 341-351.
(Continued)

*Primary Examiner* — Lucas Stelling
(74) *Attorney, Agent, or Firm* — Womble Carlyle Sandridge & Rice LLP (57) ABSTRACT

In a method of manufacturing a bimetallic catalyst for reductively decomposing nitrate nitrogen, a powder including a trivalent iron oxide, a powder including a trivalent iron oxyhydroxide powder or a combination thereof is mixed in an aqueous solution. A copper precursor and a palladium precursor are mixed in the aqueous solution to form a
(Continued)

precursor mixture. The precursor mixture is dried. The dried precursor mixture is fired at a temperature from about 300° C. to about 450° C. to form a fired product. The fired product is reduced by a reducing agent. A hydrochloric acid solution is mixed in the aqueous solution, or mixed with the copper precursor or the palladium precursor.

13 Claims, 9 Drawing Sheets

(51) Int. Cl.
  *B01J 23/89*  (2006.01)
  *B01J 37/03*  (2006.01)
  *B01J 37/04*  (2006.01)
  *B01J 37/08*  (2006.01)
  *B01J 37/16*  (2006.01)
  *C02F 1/70*  (2006.01)
  *B01J 35/00*  (2006.01)
  *C02F 101/16*  (2006.01)
  *C02F 103/06*  (2006.01)

(52) U.S. Cl.
  CPC ........... *B01J 35/002* (2013.01); *B01J 37/035* (2013.01); *B01J 37/04* (2013.01); *B01J 37/08* (2013.01); *B01J 37/16* (2013.01); *B01J 23/745* (2013.01); *B01J 23/8906* (2013.01); *C02F 2101/163* (2013.01); *C02F 2103/06* (2013.01); *C02F 2305/00* (2013.01)

(58) Field of Classification Search
  CPC .. B01J 37/04; B01J 37/08; B01J 37/16; C02F 1/705; C02F 2101/163; C02F 2103/06; C02F 2306/00
  See application file for complete search history.

(56)  References Cited

FOREIGN PATENT DOCUMENTS

KR  2010-0108040 A  10/2010
KR  2013-0113120 A  10/2013

OTHER PUBLICATIONS

Jung, J., et al., "Nitrate reduction by maghemite supported Cu—Pd bimetallic catalyst," *Applied Catalysis B: Environmental*, 2012, vol. 127, pp. 148-158.
Liou, Y., et al., "Selective Decomposition of Aqueous Nitrate into Nitrogen Using Iron Deposited Bimetals," *Environ. Sci. Technol.*, 2009, vol. 43, pp. 2482-2488.

* cited by examiner

BIMETALLIC CATALYST FOR HIGH NITRATE NITROGEN REDUCTION AND SELECTIVITY AND MANUFACTURING METHODS THEREOF

CROSS-REFERENCE TO RELATED APPLICATIONS

The present application is a U.S. National Stage of International Patent Application PCT/KR2014/003081, filed Apr. 9, 2014, and claims priority to Korean Patent Application No. 10-2014-0016262, filed Feb. 12, 2014. The disclosures of each of the applications noted above are incorporated herein by reference in their entirety.

BACKGROUND

1. Field

Example embodiments of the present invention relate to bimetallic catalysts for a nitrate nitrogen reduction and manufacturing methods thereof. More particularly, example embodiments of the present invention relate to bimetallic catalysts including copper nanoparticles and palladium nanoparticles loaded on a hematite support, manufacturing methods thereof, and methods of decomposing nitrate nitrogen using the bimetallic catalysts.

2. Description of the Related Art

Nitrate nitrogen is widely known as a contaminant in industrial wastewater, livestock wastewater, underground water, etc. Having water contaminated by nitrate nitrogen can cause various health problems. Further, eutrophication may occur when nitrate nitrogen excessively exists in an ecosystem.

Methods of removing nitrate nitrogen include a biological denitrification, an ion-exchange method or a metal catalyst method. As for the biological denitrification, a treatment rate is very low, and a continuous carbon feed for microorganisms is needed. Further, a concentration of the microorganisms is not easily maintained in case of an environmental change, e.g., a change in a concentration of a treatment water, and a removal of the microorganisms and carbon is needed after treatment. As for the ion-exchange method, a salt water of a high concentration is used, and thus a treatment of concentrated salts is required. Further, a treatment water after treating a contaminated water may be corrosive.

Accordingly, methods of decomposing nitrate nitrogen using a metal or a bimetal loaded on a support have been researched. Particularly, various methods of efficiently decomposing nitrate nitrogen using the bimetal have been progressed. In the methods, metals including copper (Cu), tin (Sn), nickel (Ni), palladium (Pd), platinum (Pt), gold (Au), rhodium (Rh), etc., have been loaded on various supports. Recently, a combination of copper and palladium has been known to efficiently decompose nitrate nitrogen by generating a nitrogen gas.

To reuse a catalyst for decomposing nitrate nitrogen, a suitable support has been developed. In a recent developed approach, a transition metal is loaded on a magnetic support to be used for a reduction reaction, and then the catalyst is recovered using a magnet.

For example, in Korean Patent Publication No. 10-2010-0108040 published on Oct. 6, 2010, a method of decomposing nitrate nitrogen using a catalyst in which a transition metal is loaded on zerovalent iron is disclosed. In Environ. Sci. Technol. 43 (2009) p 2482-2488, a catalyst is manufactured by loading copper and palladium precursors on iron particles. In Applied Catalysis B: Environmental 46(2): p 341-351, a catalyst is manufactured by loading copper and palladium on titania.

In Korean Patent Publication No. 10-2013-0113120 published on Oct. 15, 2013, lepidocrocite is used as a starting material, and a maghemite catalyst on which copper and palladium are loaded is manufactured.

Despite the above mentioned technologies, a development of a catalyst having a high efficiency of reductively decomposing nitrate nitrogen and a high selectivity for a non-toxic final product of nitrogen gas is still required.

SUMMARY

Example embodiments of the present invention provide a novel bimetallic catalyst having a high efficiency of reductively decomposing nitrate nitrogen and a high selectivity for a nitrogen gas among final products of the reductive decomposing reaction, manufacturing methods thereof, and methods of decomposing nitrate nitrogen using the catalyst.

According to example embodiments, there is provided a method of manufacturing a bimetallic catalyst for reductively decomposing nitrate nitrogen. In the method, a powder including a trivalent iron oxide, a powder including a trivalent iron oxyhydroxide powder or a combination thereof is mixed in an aqueous solution. A copper precursor and a palladium precursor are mixed in the aqueous solution to form a precursor mixture. The precursor mixture is dried. The dried precursor mixture is fired at a temperature from about 300° C. to about 450° C. to form a fired product. The fired product is reduced by a reducing agent. A hydrochloric acid solution is mixed in the aqueous solution, or mixed with the copper precursor or the palladium precursor.

In example embodiments, the trivalent iron oxide may include hematite ($\alpha$-$Fe_2O_3$), magnetite ($Fe_3O_4$) or maghemite ($\gamma$-$Fe_2O_3$). These may be used alone or in a combination thereof.

In example embodiments, the trivalent iron oxyhydroxide may include goethite ($\alpha$-FeOOH), akagenite ($\beta$-FeOOH) or lepidocrosite ($\gamma$-FeOOH). These may be used alone or in a combination thereof.

In example embodiments, a mole ratio of the copper precursor and the palladium precursor may range from about 10:1 to about 1:10.

In example embodiments, each amount of the copper precursor and the palladium precursor may range from about 0.05 weight percent to about 10 weight percent based on a total weight of a finally obtained catalyst.

In example embodiments, the reducing agent in the step may include $NaBH_4$ or hydrogen.

In example embodiments, an obtained catalyst may be purified after the firing step. The purifying includes filtering and washing the obtained catalyst.

According to an aspect of the present inventive concepts, there is provided a bimetallic catalyst for reductively decomposing nitrate nitrogen manufactured according to example embodiments. The bimetallic catalyst includes a hematite support, and copper nanopaticles and palladium nanoparticles loaded on the support.

In example embodiments, the hematite support may be obtained using a trivalent iron oxide or a trivalent iron oxyhydroxide selected from goethite, lepidocrosite, hematite and magnetite as a source material.

According to an aspect of the present inventive concepts, there is provided a method of reductively removing nitrate nitrogen using the bimetallic catalyst according to example embodiments.

In example embodiments, the reductively removal of nitrate nitrogen may be performed at a temperature ranging from about 5° C. to about 35° C., and in an anaerobic condition or in a reductive gas.

In example embodiments, the reductive gas may include a hydrogen gas.

According to an aspect of the present inventive concepts, there is provided a method of purifying a moisture included in an underground water or a wastewater. In the method, nitrate nitrogen included in the underground water or the wastewater is reductively removed using the bimetallic catalyst according to example embodiments.

According to example embodiments of the present inventive concepts, the catalyst efficiently removing nitrate nitrogen and having a high selectivity for a non-toxic nitrogen gas may be provided. Additionally, a support of the catalyst may be prepared using natural materials so that the environmental friendliness may be also improved.

BRIEF DESCRIPTION OF THE DRAWINGS

Example embodiments will be more clearly understood from the following detailed description taken in conjunction with the accompanying drawings. FIGS. 1 to 10 represent non-limiting, example embodiments as described herein.

DETAILED DESCRIPTION OF THE EMBODIMENTS

Various exemplary embodiments will be described more fully, in which some exemplary embodiments are shown. The present inventive concept may, however, be embodied in many different forms and should not be construed as limited to the exemplary embodiments set forth herein. Rather, these exemplary embodiments are provided so that this description will be thorough and complete, and will fully convey the scope of the present inventive concept to those skilled in the art.

As used herein, the term "and/or" includes any and all combinations of one or more of the associated listed items.

It will be understood that, although the terms first, second, third etc. may be used herein to describe various elements and/or components, these elements and/or components should not be limited by these terms. These terms are only used to distinguish one element or component from another. Thus, a first element or component discussed below could be termed a second element or component without departing from the teachings of the present inventive concept.

The terminology used herein is for the purpose of describing particular exemplary embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Figure 1:
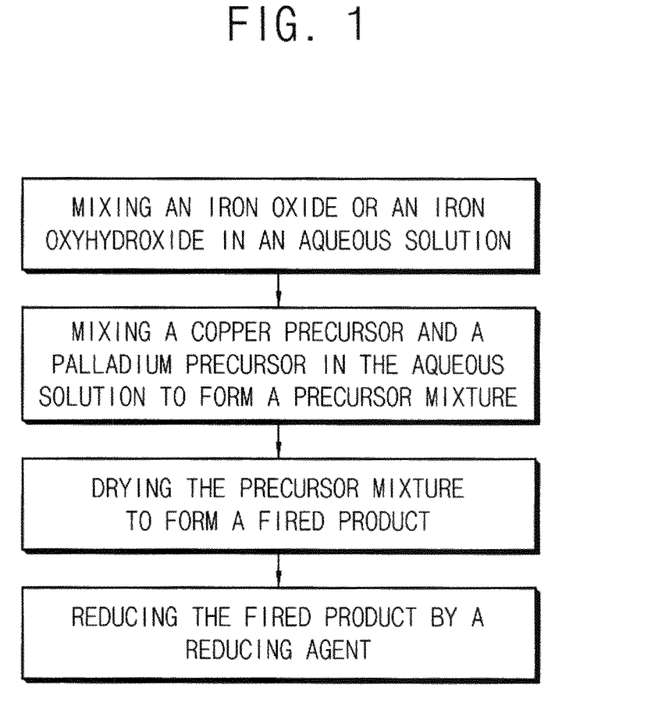
FIG. 1 is a flow chart illustrating a method of manufacturing a catalyst in accordance with example embodiments.

FIG. 1 is a flow chart illustrating a method of manufacturing a catalyst in accordance with example embodiments.

As illustrated in FIG. 1, the method may include mixing an iron oxide or an iron oxyhydroxide in an aqueous solution, mixing a copper precursor and a palladium precursor in the aqueous solution to form a precursor mixture, drying the precursor mixture to form a fired product, and reducing the fired product by a reducing agent.

More particularly, the method may include (a) mixing a trivalent iron oxide powder, a trivalent iron oxyhydroxide powder or a mixture powder thereof in an aqueous solution; (b) mixing a copper precursor and a palladium precursor in the aqueous solution to form a precursor mixture; (c) drying the precursor mixture; (d) firing the precursor mixture at a temperature ranging from about 300° C. to about 450° C. to form a fired product; (e) reducing the fired product by a reducing agent. In an embodiment, a hydrochloric acid solution may be mixed in the aqueous solution of the step (a), or the hydrochloric acid solution may be added to the copper precursor and the palladium precursor in the step (b).

In example embodiments, the trivalent iron oxide powder and the trivalent iron oxyhydroxide powder may include an iron oxide or an iron oxyhydroxide in which iron may exist in an oxidation number of 3. For example, a trivalent iron oxide may include hematite ($\alpha$-$Fe_2O_3$), magnetite ($Fe_3O_4$), maghemite ($\gamma$-$Fe_2O_3$) or the like, a trivalent iron oxyhydroxide may include goethite ($\alpha$-FeOOH), akagenite ($\beta$-FeOOH), lepidocrosite ($\gamma$-FeOOH) or the like.

The trivalent iron oxide or the trivalent iron oxyhydroxide may be found naturally, and thus may be used as an eco-friendly source material.

Additionally, the trivalent iron oxide or the trivalent iron oxyhydroxide may be potentially utilized for various applications. A catalyst support including the trivalent iron oxide or the trivalent iron oxyhydroxide may have a toxicity less than other nano-particle supports.

The catalyst support including the trivalent iron oxide or the trivalent iron oxyhydroxide may have a magnetic property so that the catalyst support may be easily recovered using a magnet. Thus, a recovery of a catalyst after completion of a catalyst reaction may be efficiently carried out with a small cost. Specifically, a reproduction cost of the catalyst may be reduced through the efficient recovery of the catalyst, and a loss of noble metals loaded on a bimetallic catalyst system may be avoided.

In mixing the trivalent iron oxide or the trivalent iron oxyhydroxide in the aqueous solution (e.g., the step (a)), an weight of the aqueous solution may be about 5 times to about 1,000 times, preferably about 10 times to about 500 times, a weight of the trivalent iron oxide or the trivalent iron oxyhydroxide.

In an embodiment, the trivalent iron oxide or the trivalent iron oxyhydroxide may be dispersed in the aqueous solution as a slurry form.

The copper precursor and the palladium precursor may be loaded as copper(0) and palladium(0) on a support finally obtained according to example embodiments.

For example, the copper precursor may include copper oxide, copper sulfate, copper phosphate, copper sulfide, copper halogenide, an organocopper compound, a copper coordination compound, or the like. An oxidation number of copper may range from 1 to 3 in the above compounds.

The palladium precursor may include palladium oxide, palladium sulfate, palladium phosphate, palladium halogenide, an organopalladium compound, a palladium coordination compound, or the like. An oxidation number of palladium may be 0, 2 or 4 in the above compounds.

In an embodiment, copper sulfate, copper chloride, copper acetate or copper oxalate may be used as the copper precursor. Palladium chloride, palladium sulfate, palladium acetate or a palladium coordination compound may be used as the palladium precursor. These may be used alone or in a combination thereof.

In the step (b), a mole ratio of the copper precursor and the palladium precursor may range from about 10:1 to about 1:10, preferably from about 4:1 to about 1:4. However, the mole ratio may be adjusted in consideration of a reaction condition, a composition of a product from a catalytic decomposition reaction, a manufacture cost of the catalyst, etc.

In an embodiment, the both precursors may be mixed together (e.g., the step (b)), and then dried (e.g., the step (c)). In an embodiment, one of the both precursors may be added, and then dried (e.g., the step (c)). Subsequently, the other precursor may be added, dried again (e.g., the step(c)), and then fired.

Each amount of the copper precursor and the palladium precursor may range from about 0.05 weight percent (wt %) to about 10 wt %, preferably from about 0.1 wt % to about 5 wt %, based on a total weight of the finally obtained catalyst. When the amount of the precursor is excessively small, an activity of the catalyst may be reduced. When the amount of the precursor is excessively large, a manufacture cost of the catalyst may be increased.

In an aspect of the present inventive concepts distinguished over the prior art, the hydrochloric acid solution may be mixed in the aqueous solution of the step (a), or may be added to the copper precursor or the palladium precursor of the step (b).

When the hydrochloric acid solution is mixed with the aqueous solution of the step (a), or the copper precursor or the palladium precursor of the step (b), a hydrochloric acid component in the aqueous solution may be reacted with the trivalent iron oxide, the trivalent iron oxyhydroxide or the mixture powder thereof to result in a transformation of the iron oxide into a hematite form through the firing and reduction steps.

Preferably, the hydrochloric acid solution may be mixed one of the copper precursor and the palladium precursor of the step (b). Alternatively, the hydrochloric acid solution may be mixed with both of the copper precursor and the palladium precursor.

A concentration of the hydrochloric acid solution in the aqueous solution or the precursor mixture including the copper precursor and the palladium precursor may range from about 0.01 M to about 5 M, preferably, from about 0.02 M to about 2 M.

The trivalent iron oxide or the trivalent iron oxyhydroxide of example embodiments may be assumed to be transformed into hematite via an iron-oxychloride (FeOCl) form by a treatment of the hydrochloric acid solution. The transformation process may be represented by the following reaction equations.

$$Fe_2O_3 + 2HCl + H_2O \rightarrow 2FeOCl + 2H_2O$$

$$2FeOOH + 2HCl + H_2O \rightarrow 2FeOCl + 3H_2O$$

In example embodiments, a temperature of the drying step (e.g., the step (c)) may range from about 50° C. to about 150° C. In this case, the drying step may be maintained for about 1 hour to about 7 days, preferably about 3 hours to about 3 days. The drying step may be performed using, e.g., an oven or a vacuum dryer.

The firing step (e.g., the step (d)) may be maintained for about 10 minutes to about 10 hours, preferably about 30 minutes to about 5 hours.

In example embodiments, the reducing agent used in the step (e) may be selected from $NaBH_4$ or hydrogen.

In some example embodiments, the method may further include purifying the catalyst that may include filtering and washing the obtained catalyst after the step (e). In this case, the filtering and washing may include washing repeatedly, e.g., one to ten times using an aqueous solution.

According to example embodiments, a catalyst for decomposing nitrate nitrogen by a reductive reaction may be provided. The catalyst may be obtained by the method as described above, and may include a hematite support on which copper nanoparticles and palladium nanoparticles are loaded.

In example embodiments, the trivalent iron oxide, the trivalent iron oxyhydroxide or the mixture powder thereof used herein may be transformed into a hematite form having a great surface area through the steps (a) through (e) in the aqueous solution including the hydrochloric acid solution, and may be prepared as a support for the copper nanoparticles and the palladium nanoparticles.

The hematite form of the finally obtained support may be acknowledged from an X-ray diffraction (XRD) analysis, which is described in detail using Examples below.

In some example embodiments, the finally obtained hematite support may be formed using the trivalent iron oxide or the trivalent iron oxyhydroxide selected from goethite, lepidocrosite, hematite and maghemite ($\gamma$-Fe$_2$O$_3$) as a source material.

According to example embodiments, a method of removing nitrate nitrogen through a reductive reaction using the catalyst may be provided.

In the method, a preferable condition of the reductive reaction may include a reaction temperature ranging from about 5° C. to about 35° C. in an anaerobic condition or in a reductive gas. In this case, the reductive gas may include hydrogen or a mixture of hydrogen and nitrogen.

According to example embodiments, a method of purifying a moisture included in soil, underground water or wastewater may be provided. In the method, nitrate nitrogen contained in soil, underground water or wastewater may be removed using the catalyst of the present inventive concepts.

Hereinafter, detailed descriptions on the present inventive concepts are provided using Examples. The scope of the present invention is not to be construed as limited by the Examples below.

EXAMPLE 1

Reagents used in Examples below are those capable of being purchased commercially or prepared in a laboratory by those ordinarily skilled in the art.

Lepidocrosite ($\gamma$-Fe$^{III}$OOH, Bayferrox 943), hematite ($\alpha$-Fe$^{III}_2$O$_3$, Bayferrox 105M) and goethite (Bayferrox 3920) were purchased from LANXESS, and maghemite was purchased from Sigma Aldrich.

Copper(II) chloride dihydrate (CuCl$_2$.2H$_2$O, 97.5%) was used as a copper precursor and palladium chloride (PdCl$_2$, 99.9%) was used as a palladium precursor. NaBH$_4$ (98.0%) was used to reduce a bimetallic catalyst.

An analysis by an ion chromatography (IC) and a Nessler method, and a high performance liquid chromatography (HPLC) analysis (a measurement of nitrate nitrogen and nitrite nitrogen) were utilized for obtaining a result of a decomposition reaction of nitrate nitrogen. A deaerated deionized water (DDIW) was used for a preparation and an analysis of a catalyst.

1. Preparation of a Catalyst

Hematite ($\alpha$-Fe$^{III}_2$O$_3$), goethite ($\alpha$-Fe$^{III}$OOH), maghemite ($\gamma$-Fe$^{III}_2$O$_3$) and lepidocrosite ($\gamma$-Fe$^{III}$OOH) were used as a trivalent iron oxide and a trivalent iron oxyhydroxide, and CuCl$_2$.2H$_2$O and PdCl$_2$ were used as the catalyst precursors.

Each of hematite ($\alpha$-Fe$^{III}_2$O$_3$), goethite ($\alpha$-Fe$^{III}$OOH), maghemite ($\gamma$-Fe$^{III}_2$O$_3$) and lepidocrosite ($\gamma$-Fe$^{III}$OOH) was prepared at an amount of 1.5 g, mixed in 200 ml of DIW and dispersed for 6 minutes through a sonication to produce an aqueous solution. A precursor solution including the palladium precursor and the copper precursor at an amount of about 0.4 wt % to about 2.8 wt %, respectively, was prepared.

A volume of the copper precursor solution was 25 ml and a volume of the palladium precursor solution was 50 ml. A hydrochloric acid solution was added so that a concentration of the palladium precursor solution is adjusted to a 0.5 M HCl solution.

The copper precursor solution was added to the aqueous solution and stirred for 2 hours. The palladium precursor solution was further added, stirred for 2 hours, and then dried in an oven at a temperature of 105° C. for 24 hours.

A calcination process (or a firing process) was performed on the dried catalyst in an oven at a temperature of 350° C. for 2 hours, and then a reduction process was performed.

In the reduction process, an excessive amount of 0.01M NaBH$_4$ was added dropwise on the fired catalyst. Thus, metals fixed on a surface of hematite were reduced through the reduction process.

The reactions may be represented by the following equations.

$$2PdCl_2+NaBH_4+3H_2O \rightarrow 2Pd(0)+B(OH)_3+NaCl+3HCl+2H_2 \qquad \text{Equation 1}$$

$$2CuCl_2.2H_2O+NaBH_4+H_2O \rightarrow 2Cu(0)+B(OH)_3+NaCl+3HCl+2H_2O+2H_2 \qquad \text{Equation 2}$$

Subsequently, a vacuum filtering process using a membrane filter was performed, and a washing process using DIW was performed 2 to 4 times such that the catalyst for an experiment of removing nitrate nitrogen was prepared.

The obtained catalysts were indicated as PD-Cu/hematite-H (hematite support), Pd—Cu/hematite-G (goethite support), Pd—Cu/hematite-M (maghemite support) and Pd—Cu/hematite-L (lepidocrosite support).

2. Evaluations on Catalyst Properties

Analyzing methods for detecting structures of the catalyst supports include XRD, BET, TEM-EDX and TPR methods. The catalyst including 2.8 wt % of palladium and 1.6 wt % of copper coated thereon was fired, and then reduced using NaBH$_4$ to prepare an sample. A support crystallinity of the sample was analyzed using the XRD method, and surface properties were analyzed using the BET and TEM-EDX methods.

Figure 2:
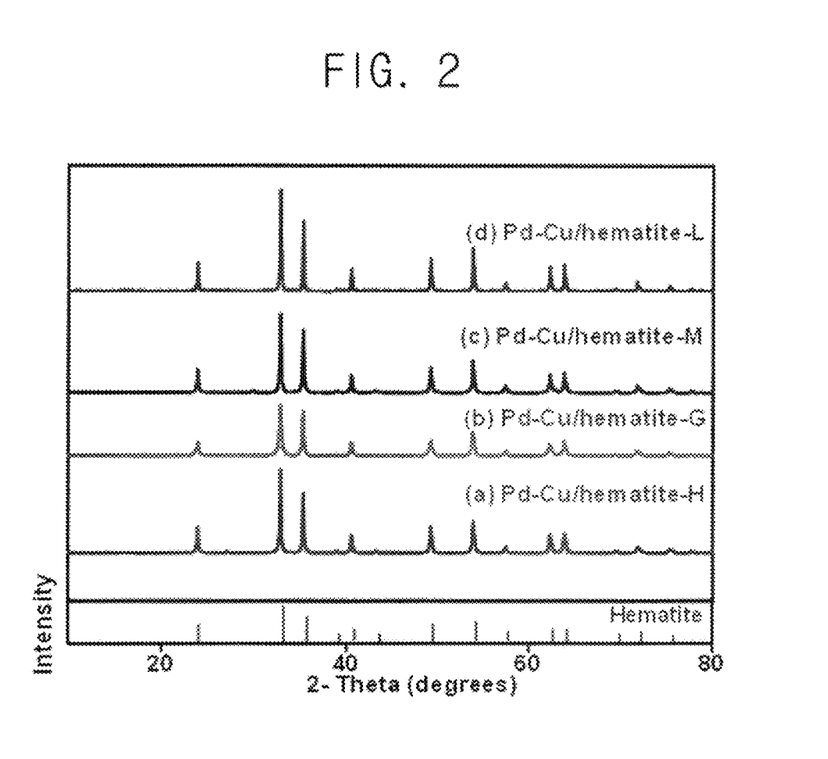
FIG. 2 is a graph showing an X-ray diffraction (XRD) analysis on catalysts obtained in accordance with example embodiments.

FIG. 2 is a graph showing an X-ray diffraction (XRD) analysis on catalysts obtained in accordance with example embodiments. As shown in FIG. 2, the supports of the obtained catalysts were substantially the same hematite.

As shown in Table 1 below, great surface areas of the catalysts including hematite supports finally obtained according to example embodiments were measured, and it was acknowledged that Pd—Cu/hematite-H had the greatest surface area.

TABLE 1

| Catalyst | Pd—Cu/hematite-H | Pd—Cu/hematite-G | Pd—Cu/hematite-M | Pd—Cu/hematite-L |
|---|---|---|---|---|
| Surface Area (m$^2$g$^{-1}$) | 15.94 | 11.42 | 7.32 | 6.92 |

Figure 3:
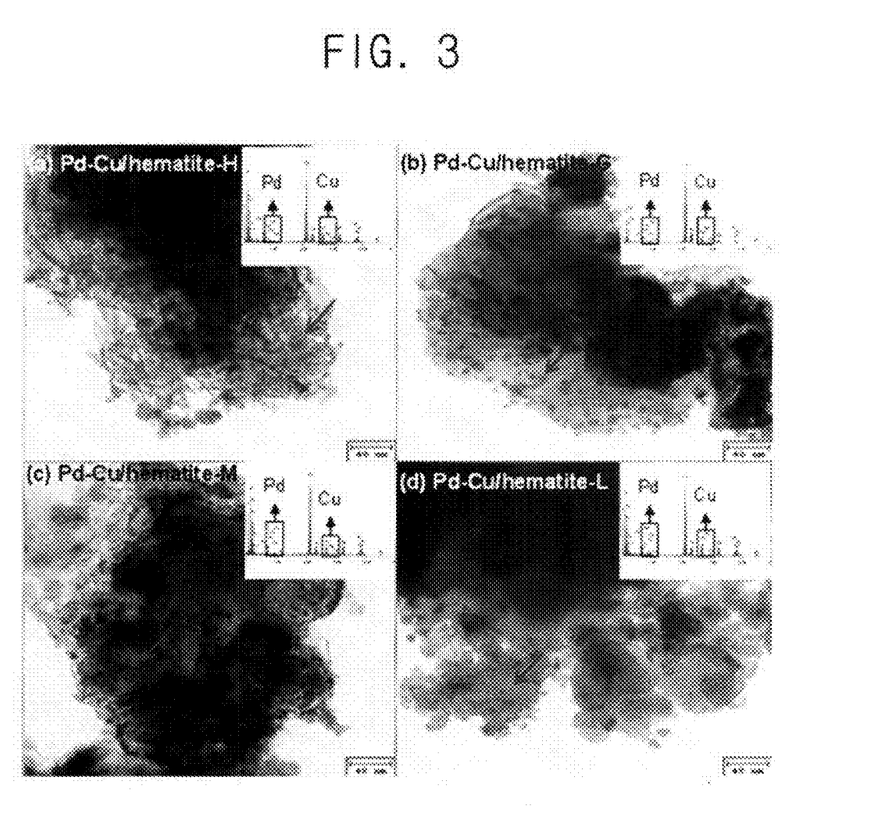
FIG. 3 is transmission electron microscopic (TEM) images of catalysts obtained in accordance with example embodiments.

FIG. 3 is TEM images of catalysts obtained in accordance with example embodiments. As shown in FIG. 3, bimetallic particles having a size of about 4 to 8 nm were uniformly distributed on the catalysts, and the particles were identified as palladium and copper.

Figure 4:
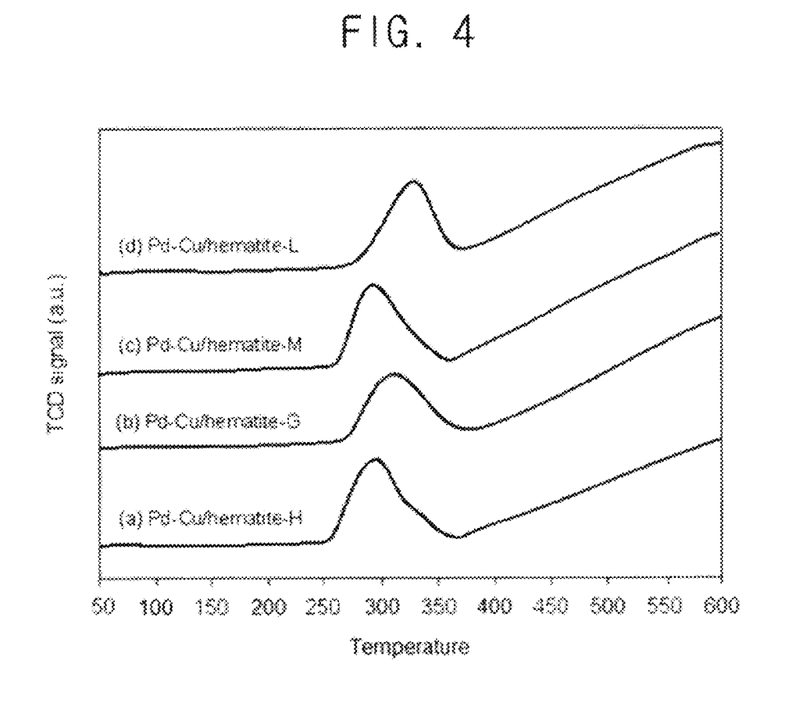
FIG. 4 is a graph showing a temperature-programmed reduction (TPR) analysis on catalysts obtained in accordance with example embodiments.

FIG. 4 is a graph showing a TPR analysis on catalysts obtained in accordance with example embodiments. As shown in FIG. 4, peaks were detected near a temperature of about 300° C. in all the catalysts. The peak indicates a reduction of copper oxide, and it is known that two metals are interacted more intimately when the peak is detected at a lower temperature. Pd—Cu/hematite-H showed the lowest peak temperature (about 292° C.), and thus had a greatest interaction between the metals.

3. Experiments of Decomposing Nitrate Nitrogen using Catalysts 4 hematite catalysts obtained according to example embodiments were applied to experiments on decomposing nitrate nitrogen as follows.

A 500 ml glass reactor including gas inlet and outlet for hydrogen and carbon dioxide gases, and sampling and injection ports, and equipped with a stirrer was prepared. DDIW and 0.25 g of the bimetallic catalyst according to example embodiments were introduced in the reactor, and the catalyst was uniformly stirred through a sonication.

The gas outlet of the reactor was connected to an ammonia capture container including sulfuric acid, so that an ammonia gas was able to be collected during a reaction.

The stirring rate of the stirrer was maintained at 100 rpm, a temperature of the reactor was maintained at a room temperature. The hydrogen gas was provided continuously through the gas inlet to form an anaerobic condition to progress the catalyst reaction.

The hydrogen gas was provided for about 30 minutes before an injection of a liquid storage of a highly concentrated nitrate nitrogen to remove remaining oxygen in a solution.

The experiment of decomposing nitrate nitrogen included a treatment of 30 ppm nitrate nitrogen. In the experiment, the hydrogen gas was used as a reducing agent, and the carbon dioxide gas was used as a buffering agent.

Figure 5:
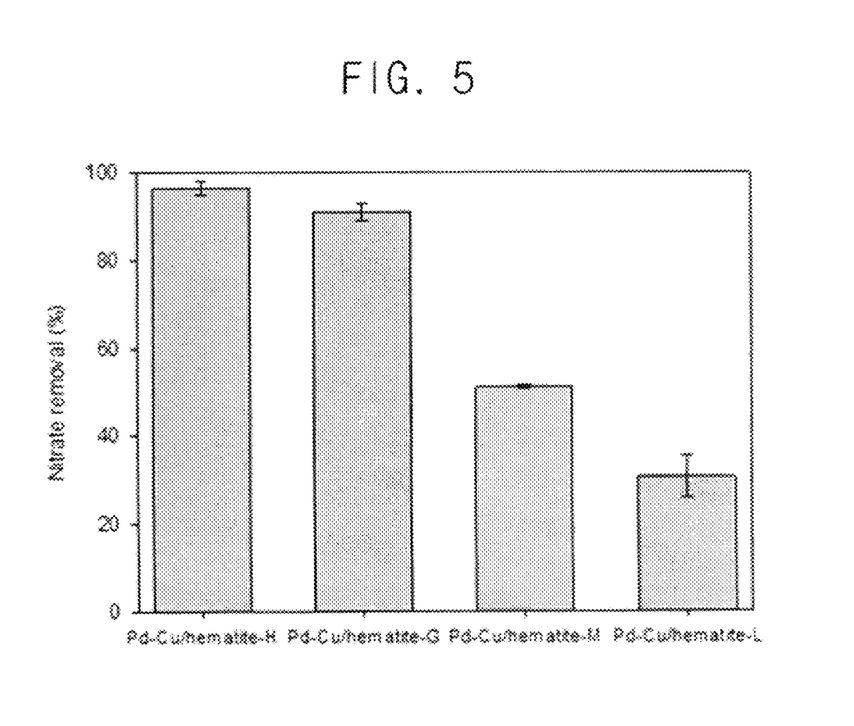
FIG. 5 is a graph showing a removal efficiency of nitrate nitrogen from an experiment of decomposing nitrate nitrogen using catalysts obtained in accordance with example embodiments.

FIG. 5 is a graph showing a removal efficiency of nitrate nitrogen from an experiment of decomposing nitrate nitrogen using catalysts obtained in accordance with example embodiments. FIG. 5 shows results of decomposing nitrate nitrogen after 90 minutes using the 4 hematite catalysts.

As shown in FIG. 5, Pd—Cu/hematite-H showed the greatest removal efficiency (96.4%) supposedly due to the great surface area and the intimate bimetallic interaction.

The hematite catalyst having a high surface area manufactured according to example embodiments is novel, eco-friendly and economic, and may show an improved removal efficiency (96.4%) in a short time (90 minutes).

Experiments described below were carried out using Pd—Cu/hematite-H (hereinafter, referred to as Pd—Cu/hematite) that showed the greatest efficiency.

Figure 6:
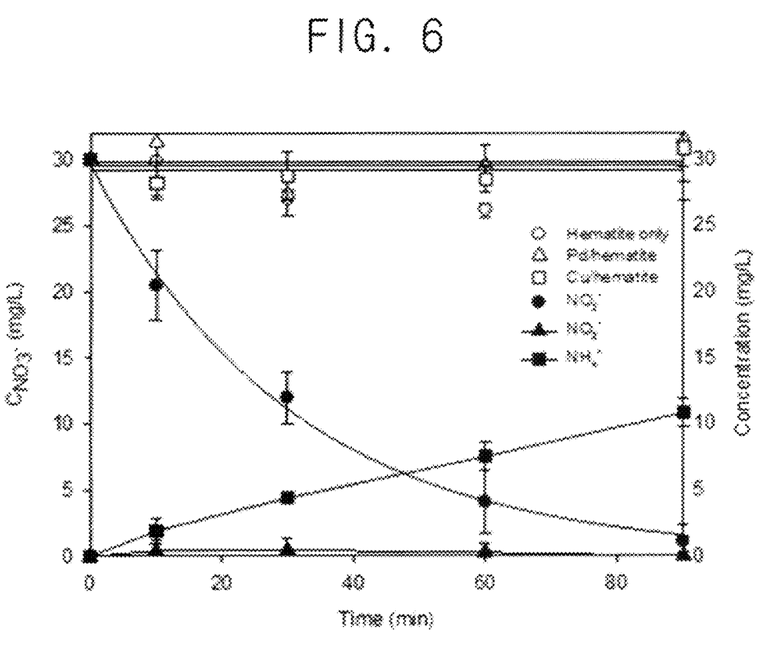
FIG. 6 is a graph showing a concentration change of nitrate nitrogen from an experiment of nitrate nitrogen decomposition using catalysts obtained in accordance with example embodiments.

FIG. 6 is a graph showing a concentration change of nitrate nitrogen from an experiment of nitrate nitrogen decomposition using catalysts obtained in accordance with example embodiments. FIG. 6 shows a comparative analysis of products decomposed by the bimetallic catalyst obtained according to example embodiments, only by hematite, and by single metallic catalysts (Pd/hematite, Cu/hematite). When the hematite was solely used, or the single metallic catalyst was used, a removal rate below about 6% was measured after 90 minutes. The result indicates that nitrate nitrogen may not be sufficiently removed only by support material or the single metallic catalyst, and the bimetallic catalyst may be needed in order to achieve a desired removal rate of nitrate nitrogen. When the bimetallic catalyst was used, a nitrite nitrogen ($NO_2^-$) level was slightly increased for initial 10 minutes by about 4%, however, the $NO_2^-$ level was decreased after 10 minutes. An amount of an ammonium ion was consistently increased.

A removal rate of nitrate nitrogen and a selectivity of byproduct may be calculated from the following equations. The generation rate of NO or $N_2O$ was extremely small, and thus omitted in the equations.

$$X_{NO_3}-(\%) = \frac{[NO_3^-]_i - [NO_3^-]_f}{[NO_3^-]} \quad \text{Equation 3}$$

$$S_{NO_2}-(\%) = \frac{[NO_2^-]_f}{[NO_3^-]_i - [NO_3^-]_f} \quad \text{Equation 4}$$

$$S_{NH_4}+(\%) = \frac{[NH_4^+]_f}{[NO_3^-]_i - [NO_3^-]_f} \quad \text{Equation 5}$$

$$S_{N_2}(\%) = \frac{[NO_3^-]_i - [NO_3^-]_f - [NO_2^-]_f - [NH_4^+]_f}{[NO_3^-]_i - [NO_3^-]_f} \quad \text{Equation 6}$$

In the above equations, subscripts "i" and "f" indicate an initial value and a final value, respectively, and the selectivity of nitrogen gas may be calculated from a mass balance of nitrogen.

An X-ray photoelectron spectroscopy (XPS) method was performed to further study a decomposing mechanism of nitrate nitrogen on the bimetallic catalyst obtained according to example embodiments. For this purpose, the catalyst reduced by $NaBH_4$ was dried in a freezing dryer for about a day, and a sample was prepared in an anaerobic chamber. The sample was transferred in ethanol in order to prevent an oxidation.

Figure 7:
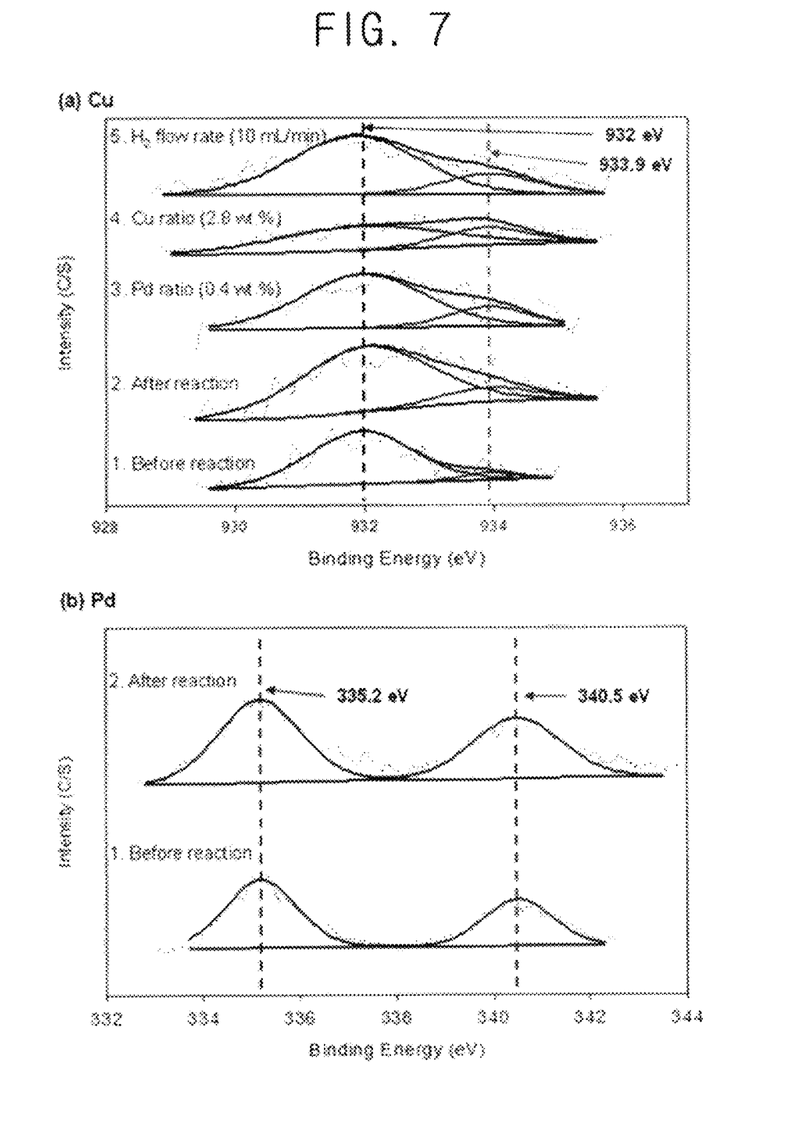
FIG. 7 is a graph showing oxidation number changes of two metals on a surface of a catalyst obtained in accordance with example embodiments before and after performing an experiment of nitrate nitrogen decomposition.

FIG. 7 is a graph showing oxidation number changes of two metals on a surface of a catalyst obtained in accordance with example embodiments before and after performing an experiment of nitrate nitrogen decomposition. In part (a) of FIG. 7, headings 1 and 2 indicate the oxidation numbers of copper before and after reaction. A value of 932 eV indicates zerovalent copper (Cu(0)), and a value of 933.9 eV indicates divalent copper oxide (Cu(II)O). It is acknowledged that a peak of copper oxide after reaction ((a) 2 of FIG. 7) became larger than that before reaction ((a) 1 of FIG. 7). This indicates that copper directly participated in the reaction to be oxidized in the decomposition of nitrate nitrogen.

In part (b) of FIG. 7, headings 1 and 2 indicate the oxidation numbers of palladium before and after reaction. As shown in (b) of FIG. 7, positions of peaks before and after reaction are the same as each other. A value of 335.2 eV and a value of 340.5 eV indicate zerovalent palladium (Pd(0)). This indicates that palladium did not directly participate in the reaction. However, it is known that hydrogen gas may be decomposed and adsorbed on a palladium surface as hydrogen atoms, and the hydrogen atoms may be directly participate in the reaction as represented by the following reaction equations.

$NO_3^-+Cu(0) \rightarrow Cu(II)O+NO_2^-$  Equation 7

$2NO_2^-+12H_{ads}\text{-Pd}(0) \rightarrow Pd(0)+2NH_4^++4OH^-$  Equation 8

$2NO_2^-+4H_{ads}\text{-Pd}(0) \rightarrow Pd(0)+N_2+4OH^-$  Equation 9

As represented by the above reaction equations, nitrite nitrogen may be finally decomposed to an ammonium ion or a nitrogen gas (Reaction Equations 8 and 9). Here, the ammonium ion may be toxic, and thus may be reduced into the nitrogen gas.

The hydrogen atom on palladium may reduce oxidized copper to zerovalent copper to facilitate the nitrate nitrogen decomposition.

4. Experiments on Nitrate Nitrogen Decomposition Varying Components of Catalysts and Hydrogen Contents 4-1. Decomposition of Nitrate Nitrogen and Selectivity for Nitrogen Gas According to an Amount of Palladium A selectivity for a nitrogen gas was measured using the catalyst obtained according to example embodiments. The experiment was performed at 25° C. for 180 minutes, and an amount of copper was fixed to 1.6 wt % while varying an amount of palladium (0.4, 1.0, 1.3, 2.2, 2.8 wt %).

Figure 8:
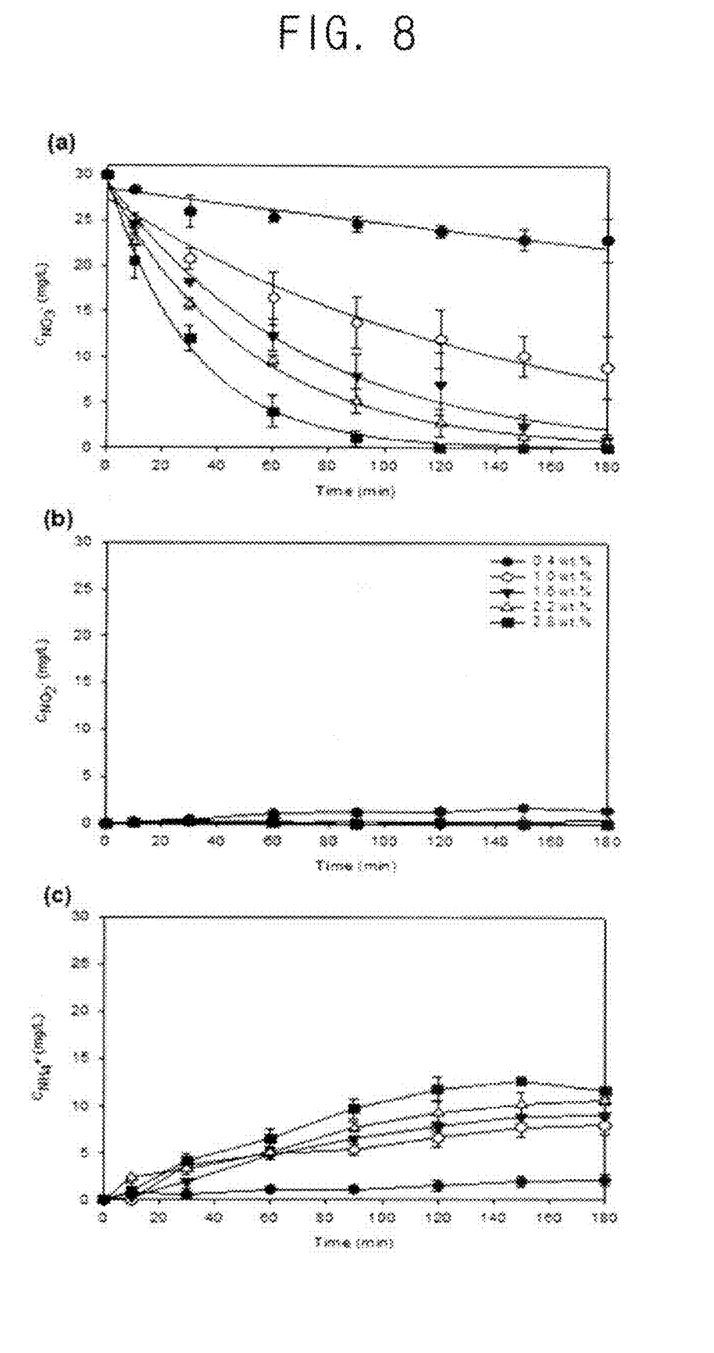
FIG. 8 is a graph showing concentration changes of nitrate nitrogen, nitrite nitrogen, and ammonium ion varying an amount of palladium in a catalyst obtained in accordance with example embodiments.

FIG. 8 is a graph showing concentration changes of nitrate nitrogen, nitrite nitrogen, and ammonium ion varying an amount of palladium in a catalyst obtained in accordance with example embodiments. A removal ratio and the selectivity after 180 minutes are listed in Table 2 below.

TABLE 2

| Palladium (wt %) | t = 180 min | | | |
|---|---|---|---|---|
| | $X_{NO3-}$ (%) | $S_{NO2-}$ (%) | $S_{NH4+}$ (%) | $S_{N2}$ (%) |
| 0.4 | 23.8 | 20.5 | 30.4 | 49.2 |
| 1 | 70.2 | 1.8 | 37.9 | 60.3 |
| 1.6 | 96.6 | 0 | 31.3 | 69.1 |
| 2.2 | 98 | 0 | 36 | 64 |
| 2.8 | 100 | 0 | 38.7 | 61.3 |

As shown in Table 2, as the amount of palladium became increased, the removal ratio was also increased. Comparison between headings 4 and 3 of part (a) in FIG. 7 may provide a cause of the trend. Amounts of palladium were 2.8 wt % and 0.4 wt % in sections 4 and 3 of part (a) in FIG. 7, respectively. It was acknowledged that a peak of copper oxide became greater in section 3 of part (a) in FIG. 7. This indicates that a large portion of oxidized copper was not transformed into zerovalent copper during a reaction mechanism, and an amount of hydrogen atoms decomposed and adsorbed was supposedly reduced as the amount of palladium became decreased.

Referring to FIG. 8 and Table 2, as the amount of palladium became increased, the selectivity for nitrite nitrogen was decreased from 20.5% to 0%, and the selectivity for ammonium ion was increased from 30.4% to 38.7%. As the amount of palladium became increased, the amount of hydrogen atoms on a surface of palladium was increased to facilitate a decomposition of nitrite nitrogen to a next step. Thus, decomposed nitrogen atoms were combined to a large amount of the hydrogen atoms relatively to other nitrogen atoms to produce ammonium ion.

From the results above, a maximum selectivity for nitrogen gas was measured to be 69.1% when the amount of palladium was 1.6 wt %.

4-2. Decomposition of Nitrate Nitrogen and Selectivity for Nitrogen Gas According to an Amount of Copper A selectivity for a nitrogen gas was measured in substantially the same condition as described above, except that an amount of palladium was fixed to 1.6 wt % while varying an amount of copper (0.4 wt % to 2.8 wt %).

Figure 9:
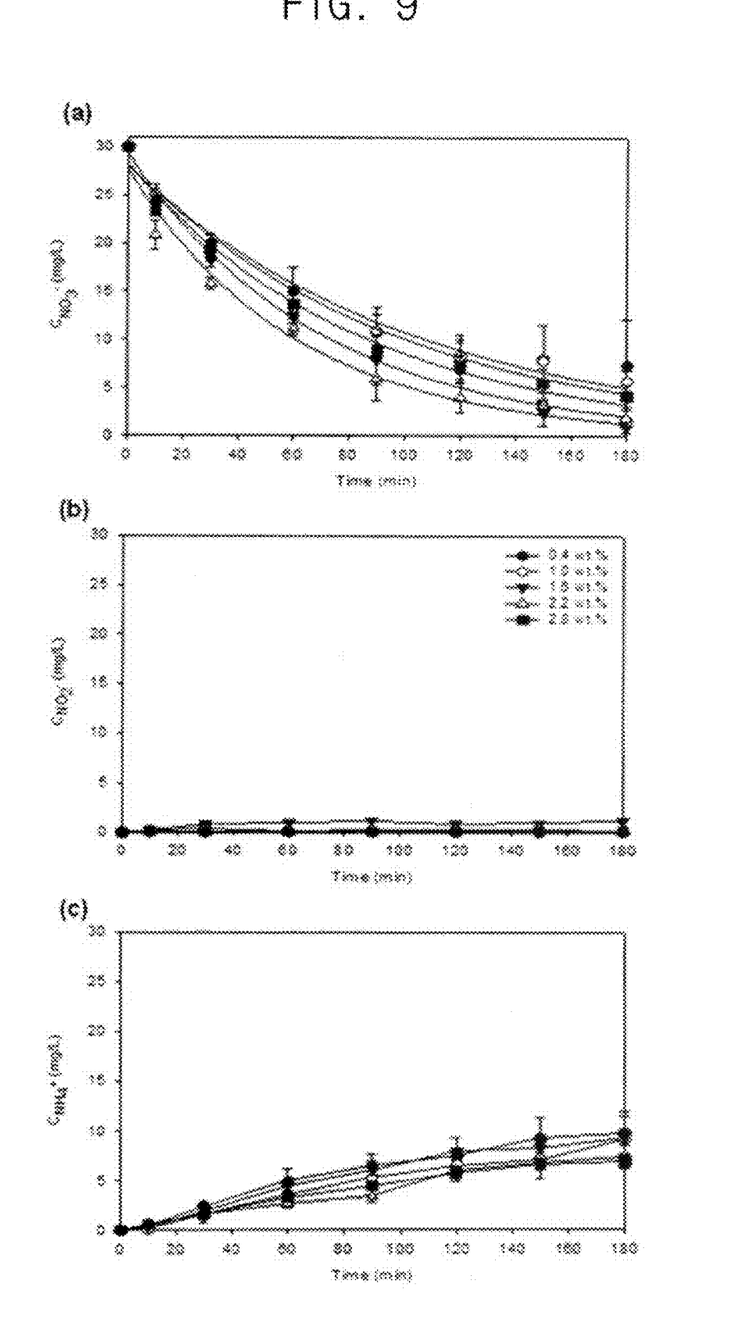
FIG. 9 is a graph showing concentration changes of nitrate nitrogen, nitrite nitrogen, and ammonium ion varying an amount of copper in a catalyst obtained in accordance with example embodiments.

FIG. 9 is a graph showing concentration changes of nitrate nitrogen, nitrite nitrogen, and ammonium ion varying an amount of copper in a catalyst obtained in accordance with example embodiments. A removal ratio and the selectivity after 180 minutes are listed in Table 3 below.

TABLE 3

| Copper (wt %) | t = 180 min | | | |
|---|---|---|---|---|
| | $X_{NO3-}$ (%) | $S_{NO2-}$ (%) | $S_{NH4+}$ (%) | $S_{N2}$ (%) |
| 0.4 | 75.2 | 0 | 43.3 | 56.7 |
| 1 | 80.7 | 1 | 37.4 | 61.7 |
| 1.6 | 96.6 | 0 | 30.9 | 69.1 |
| 2.2 | 93.6 | 1.2 | 26.4 | 72.4 |
| 2.8 | 86.1 | 2.9 | 25.5 | 71.6 |

As shown in FIG. 9 and Table 3, the removal ratio of nitrate nitrogen was increased until the amount of copper reached 1.6 wt %, and then decreased. An XPS analysis was performed in order to find the reason thereof. Referring to heading 2 (copper: 1.6 wt %) and heading 4 (copper: 2.8 wt %) of part (a) in FIG. 7, a peak of copper oxide became larger when the amount of copper was increased to 2.8 wt %. This indicates that copper covered the surface of palladium to reduce active sites thereof. Thus, an amount of hydrogen atoms adsorbed thereon was reduced. As a result, the number of the hydrogen atoms capable of being used for reducing oxidized copper was decreased.

In all cases, the selectivity for nitrite nitrogen was below 3%. Thus, it may be acknowledged that nitrate nitrogen was rapidly reduced to a next step via nitrite nitrogen. An amount of ammonium ion was decreased from 43.3% to 25.5% as the amount of copper became increased, supposedly because the number of the hydrogen atoms on the surface of palladium was decreased to reduce a probability of a combination between nitrogen and hydrogen atoms.

From the results above, a maximum selectivity for nitrogen gas was measured to be 72.4% when the amount of copper was 2.2 wt %.

4-3. Decomposition of Nitrate Nitrogen and Selectivity for Nitrogen Gas According to an Amount of Hydrogen A selectivity for a nitrogen gas was measured in substantially the same condition as described above, except that amounts of palladium and copper were fixed to 1.6 wt % and 2.2 wt %, respectively, while varying a flow rate of a hydrogen gas (10-50 ml/min).

Figure 10:
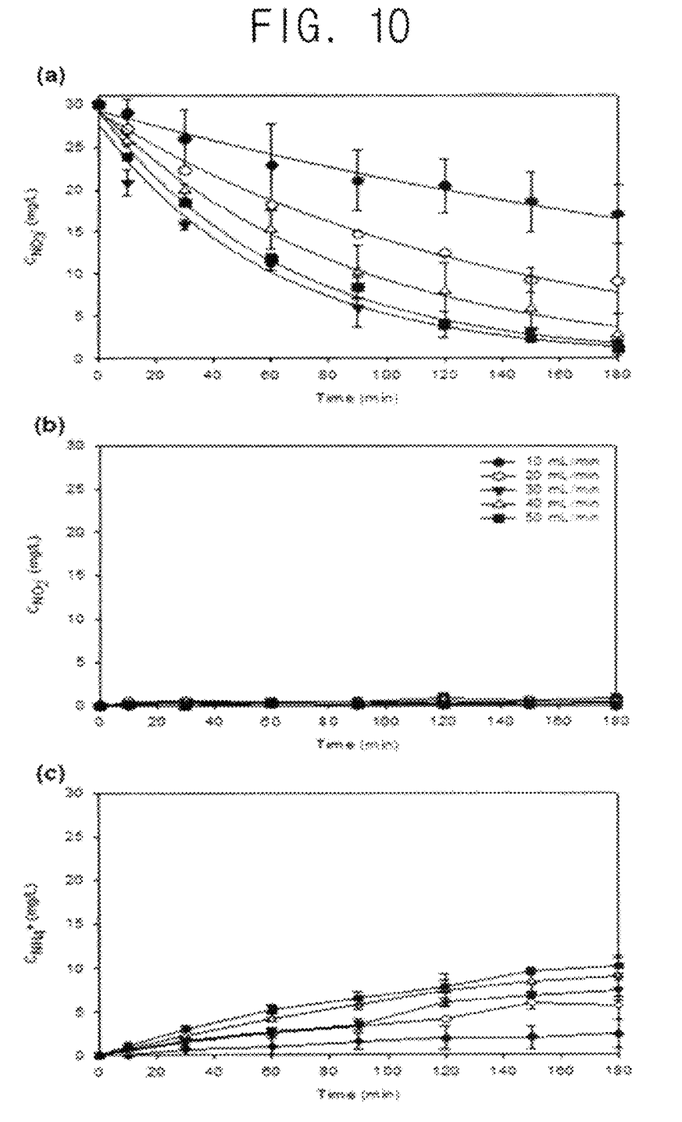
FIG. 10 is a graph showing concentration changes of nitrate nitrogen, nitrite nitrogen, and ammonium ion varying a flow rate of hydrogen gas in a catalyst obtained in accordance with example embodiments.

FIG. 10 is a graph showing concentration changes of nitrate nitrogen, nitrite nitrogen, and ammonium ion varying a flow rate of hydrogen gas in a catalyst obtained in accordance with example embodiments. A removal ratio and the selectivity after 180 minutes are listed in Table 4 below.

TABLE 4

| Flow Rate (mL/min) | t = 180 min | | | |
|---|---|---|---|---|
| | $X_{NO3-}$ (%) | $S_{NO2-}$ (%) | $S_{NH4+}$ (%) | $S_{N2}$ (%) |
| 10 | 43.2 | 8.1 | 16.3 | 75.6 |
| 20 | 69.6 | 2.5 | 27 | 70.6 |
| 30 | 93.6 | 1.2 | 26.4 | 72.4 |
| 40 | 90.5 | 0 | 32.8 | 67.2 |
| 50 | 96.3 | 0 | 35.1 | 64.9 |

As shown in FIG. 10 and Table 4, the removal ratio of nitrate nitrogen was increased as the flow rate of the hydrogen gas became increased.

Referring to headings 2 and 5 of part (a) in FIG. 7, the XPS analysis is shown when the flow rates of hydrogen gas are 30 ml/min and 10 ml/min. When the flow rate of hydrogen gas was decreased to 10 ml/min, a peak of copper oxide became relatively larger. This indicates that an amount of hydrogen atoms adsorbed on a surface of palladium was decreased as the flow rate of hydrogen gas became decreased.

Thus, it may be acknowledged that an amount of oxidized copper reduced during a removal reaction of nitrate nitrogen was decreased to result in a reduction of the removal ratio of nitrate nitrogen.

As the flow rate of hydrogen gas became increased, the selectivity for nitrite nitrogen was decreased from 8.1% to 0%, and the selectivity for ammonium ion was increased from 16.3% to 35.1%. This indicates that the amount of hydrogen atoms on the surface of palladium was increased as the flow rate of hydrogen gas became increased to facilitate a reduction of nitrite nitrogen. However, a probability that nitrogen atoms were combined to hydrogen atoms relatively to other nitrogen atoms was also increased to increase the selectivity for ammonium ion.

A maximum selectivity for nitrogen gas was 75.6% when the flow rate of hydrogen gas was 10 ml/min, however, the removal ratio of nitrate nitrogen was 43.2% which is far below an acceptable nitrate nitrogen level of drinking water. The acceptable nitrate nitrogen level of drinking water is 10 ppm ($NO_3^-$—N), and a value of 30 ppm ($NO_3^-$—N) was used in this experiment. Thus, a minimum removal ratio in order to satisfy the acceptable level is about 67%. Accordingly, an optimal flow rate of hydrogen gas may be set as 30 ml/min, in which the removal ratio was 93.6%, and the selectivity for nitrogen gas was 72.4%.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of manufacturing a bimetallic catalyst for reductively decomposing nitrate nitrogen, comprising:
    (a) mixing a powder including a trivalent iron oxide, a powder including a trivalent iron oxyhydroxide powder or a combination thereof in an aqueous solution;
    (b) mixing a copper precursor and a palladium precursor in the aqueous solution to form a precursor mixture;
    (c) reacting the powder with a hydrochloric acid solution mixed in the aqueous solution in the step (a) or with a hydrochloric acid solution mixed with the copper precursor and the palladium precursor in the step (b) to transform the powder into an iron oxychloride form in the precursor mixture;
    (d) drying the precursor mixture;
    (e) firing the dried precursor mixture at a temperature from about 300° C. to about 450° C. to form a fired product; and
    (f) reducing the fired product by a reducing agent,
    thereby producing the bimetallic catalyst on a hematite support.

2. The method of claim 1, wherein the trivalent iron oxide includes at least one selected from hematite ($\alpha$-$Fe_2O_3$), magnetite ($Fe_3O_4$) and maghemite ($\gamma$-$Fe_2O_3$).

3. The method claim 1, wherein the trivalent iron oxyhydroxide includes at least one selected from goethite ($\alpha$-FeOOH), akagenite ($\beta$-FeOOH) and lepidocrocite ($\gamma$-FeOOH).

4. The method of claim 1, wherein a mole ratio of the copper precursor and the palladium precursor ranges from about 10:1 to about 1:10.

5. The method of claim 1, wherein each amount of the copper precursor and the palladium precursor ranges from about 0.05 weight percent to about 10 weight percent based on a total weight of a finally obtained catalyst.

6. The method of claim 1, wherein the reducing agent in the step (e) includes $NaBH_4$ or hydrogen.

7. The method of claim 1, further comprising purifying an obtained catalyst after reducing the fired product by a reducing agent, wherein the purifying includes filtering and washing the obtained catalyst.

8. The method of claim 1, wherein reducing the fired product comprises reducing the fired product with a reducing agent so as to form the bimetallic catalyst including the hematite support having
    copper nanopaticles and palladium nanoparticles loaded thereon.

9. The method of claim 1, wherein mixing the powder including the trivalent iron oxide, the powder including the trivalent iron oxyhydroxide, or the combination thereof comprises mixing the powder including the trivalent iron oxide, the powder including the trivalent iron oxyhydroxide powder or the combination thereof selected from a source material including goethite, lepidocrocite, hematite and magnetite in an aqueous solution.

10. The method of claim 8, comprising applying the bimetallic catalyst to reductively remove nitrate nitrogen.

11. The method of claim 10, wherein reductively removing the nitrate nitrogen comprises reductively removing the nitrate nitrogen at a temperature ranging from about 5° C. to about 35° C., and in an anaerobic condition or in a reductive gas.

12. The method of claim 11, wherein reductively removing the nitrate nitrogen in the reductive gas comprises reductively removing the nitrate nitrogen in a hydrogen gas.

13. The method of claim 10, wherein applying the bimetallic catalyst comprises applying the bimetallic catalyst to an underground water or a wastewater so as to:
    reductively remove nitrate nitrogen and purify moisture included in the underground water or wastewater.

* * * * *